(12) United States Patent
Beckmann

(10) Patent No.: US 6,467,835 B1
(45) Date of Patent: Oct. 22, 2002

(54) COVERING PART, IN PARTICULAR FOR SHEET-METAL SUPPORTING PARTS IN MOTOR VEHICLES

(75) Inventor: Friedhelm Beckmann, Hiddenhausen (DE)

(73) Assignee: Moeller Plast GmbH, Bielefeld (DE)

(*) Notice: Subject to any disclaimer, the term of this patent is extended or adjusted under 35 U.S.C. 154(b) by 291 days.

(21) Appl. No.: 09/067,072

(22) Filed: Apr. 27, 1998

Related U.S. Application Data

(63) Continuation of application No. PCT/DE97/01240, filed on Jun. 18, 1997.

(30) Foreign Application Priority Data

Aug. 25, 1996 (DE) .......................................... 196 34 246

(51) Int. Cl.[7] .............................................. B60R 21/04
(52) U.S. Cl. ....................................... 296/189; 280/751
(58) Field of Search ................................. 296/189, 202, 296/188, 203.01, 205, 203.03, 39.1; 280/751, 748; 293/136, 120

(56) References Cited

U.S. PATENT DOCUMENTS

| | | | |
|---|---|---|---|
| 4,563,374 A | | 1/1986 | Treber et al. |
| 4,786,540 A | | 11/1988 | Bruhnke et al. |
| 5,330,805 A | | 7/1994 | Shirahata |
| 5,433,478 A | * | 7/1995 | Naruse .......................... 280/751 |
| 5,531,499 A | | 7/1996 | Vecchio et al. |
| 5,564,744 A | * | 10/1996 | Frost ............................ 280/751 |
| 5,580,116 A | * | 12/1996 | Patel et al. .................... 296/39.1 |
| 5,609,385 A | * | 3/1997 | Daniel et al. .................. 296/188 |
| 5,660,426 A | * | 8/1997 | Sugimori et al. .............. 296/189 |
| 5,725,271 A | * | 3/1998 | Patel et al. .................... 296/189 |
| 5,803,532 A | * | 9/1998 | Karuppaswamy et al. ... 296/189 |
| 5,836,641 A | * | 11/1998 | Sugamoto et al. ............ 296/189 |
| 5,927,786 A | * | 7/1999 | Kawai et al. .................. 296/39.1 |
| 5,938,273 A | * | 8/1999 | Williams et al. .............. 296/189 |
| 5,988,678 A | * | 11/1999 | Nakamura et al. ............ 280/751 |
| 5,992,914 A | * | 11/1999 | Gotoh et al. .................. 296/39.1 |

FOREIGN PATENT DOCUMENTS

| | | | | |
|---|---|---|---|---|
| DE | 31 09 266 A1 | | 2/1982 | |
| DE | 415-375 | * | 11/1991 | ................. 280/751 |
| EP | 0 069 368 A2 | | 1/1983 | |
| FR | 2 321 406 | | 3/1977 | |

OTHER PUBLICATIONS

Japanese Patent Abstract No. 59020630 (Takao et al.), dated Feb. 2, 1984.

* cited by examiner

*Primary Examiner*—Joseph D. Pape
*Assistant Examiner*—Jason Morrow
(74) *Attorney, Agent, or Firm*—Laurence A. Greenberg; Werner H. Stemer; Ralph E. Locher

(57) ABSTRACT

A covering part, in particular for sheet-metal supporting parts in motor vehicles, includes a one-piece, profiled hollow section which is produced by blow molding and can be secured exchangeably in the sheet-metal supporting part. The rear side of the hollow section has fastening elements to which corresponding sockets in the sheet-metal supporting part are assigned. It is possible for the rear side to have profilings which are disposed in sections in the longitud-inal direction. The fastening elements can be integrated in a cavity and the cavity filled with foam. The structure according to the invention ensures that energy is adequately absorbed, in particular when the cavity is filled with foam. In the event of an impact, the hollow section is basically not subject to any deformation.

18 Claims, 4 Drawing Sheets

COVERING PART, IN PARTICULAR FOR SHEET-METAL SUPPORTING PARTS IN MOTOR VEHICLES

CROSS-REFERENCE TO RELATED APPLICATION

This application is a continuation of International Application No. PCT/DE97/01240, filed Jun. 18, 1997, which designated the United States.

BACKGROUND OF THE INVENTION

Field of the Invention

The invention relates to a covering part, in particular for sheet-metal supporting parts in motor vehicles.

Safety regulations in the motor vehicle industry require energy-absorbing materials to be disposed in those internal regions which are at risk from head impact, in order to reduce the risk of injury. In order to satisfy those requirements, airbag systems or coverings produced by injection molding are disposed in the regions at risk and the coverings are backed by a suitable foam system. The installation of the elements produced from a plurality of parts by injection molding is time consuming and transition regions between the plastic parts and the foam part are associated with optical restrictions.

SUMMARY OF THE INVENTION

It is accordingly an object of the invention to provide a covering part, in particular for sheet-metal supporting parts in motor vehicles, which overcomes the hereinaforementioned disadvantages of the heretofore-known devices of this general type in such a manner that installation is simplified, while at the same time absorption of energy is satisfactory.

With the foregoing and other objects in view there is provided, in accordance with the invention, a covering part, in particular for sheet-metal supporting parts in motor vehicles, comprising a one-piece, profiled hollow section produced by blow molding.

In accordance with another feature of the invention, the hollow section can be secured exchangeably on the sheet-metal supporting part.

In accordance with a further feature of the invention, in order to facilitate the fastening, the rear side of the hollow section has fastening elements to which corresponding sockets in the sheet-metal supporting part are assigned.

In accordance with an added feature of the invention, the fastening elements are integrated in the hollow section.

In accordance with an additional feature of the invention, if the fastening elements are integrated in the hollow section, the fastening elements are placed into a mold and encapsulated by blow molding.

In accordance with yet another feature of the invention, the outside of the hollow section is provided with a surface decoration, for example including textiles or films.

In accordance with yet a further feature of the invention, the surface decoration is placed into the mold and attached to the hollow section by the blow molding procedure.

In accordance with yet an added feature of the invention, the hollow section has a rear side constructed to bear against the sheet-metal supporting part, and preferably only a part of the rear side of the hollow section bears directly against the sheet-metal supporting part.

In accordance with yet an additional feature of the invention, the hollow section has a rear side with profiling.

In accordance with again another feature of the invention, the rear side has a wall differing in thickness.

In accordance with again a further feature of the invention, the profiling is shaped in the form of steps.

In accordance with again an added feature of the invention, the wall of the rear side has a region bearing against the sheet-metal supporting part and a region running toward the outside with a lesser thickness than the region bearing against the sheet-metal supporting part.

In accordance with again an additional feature of the invention, the hollow section has a cavity filled with foam, preferably the foam is placed into a mold and encapsulated by blow molding, and preferably the foam is blown into the cavity of the hollow section in a subsequent procedure.

In accordance with still another feature of the invention, the hollow section has a rear side with bearing regions defining a cavity between the bearing regions, and foam introduced into the cavity, preferably as a profiled part.

In accordance with still a further feature of the invention, there is provided a profiled foam part differing in density from the foam filling the cavity.

In accordance with still an added feature of the invention, the hollow section has a wall with predetermined breaking points.

In accordance with still an additional feature of the invention, the profilings on the rear side of the hollow section are in sections in longitudinal direction.

In accordance with another feature of the invention, the hollow section has a rear side with bearing regions defining a cavity between the bearing regions, and foam introduced into the cavity as a profiled part, the hollow section connected to the sheet-metal supporting part by the profiled foam part.

In accordance with a further feature of the invention, the profiled foam part has fastening elements fixed therein, and the sheet-metal supporting part has sockets corresponding to the fastening elements.

In accordance with a concomitant feature of the invention, the foam and the profiled foam part are formed from different basic materials.

Other features which are considered as characteristic for the invention are set forth in the appended claims.

Although the invention is illustrated and described herein as embodied in a covering part, in particular for sheet-metal supporting parts in motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
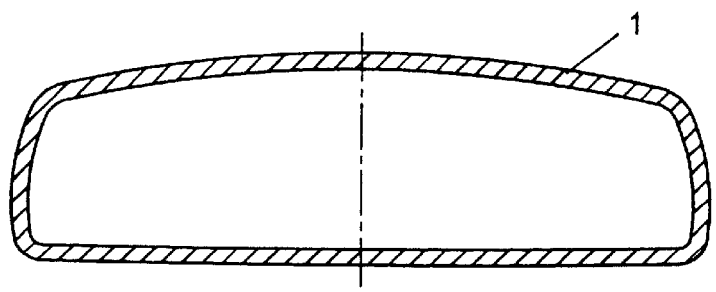
FIG. 1 is a diagrammatic, sectional view of a basic form of a hollow section.

Referring now to the figures of the drawings in detail and first, particularly, to FIG. 1 thereof, there is seen a covering part in the form of a hollow section 1 having a rear side facing downward in the drawing.

Figure 2:
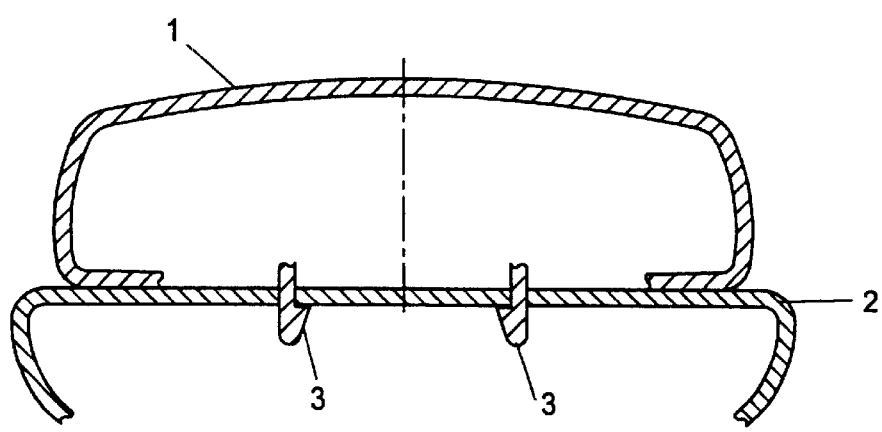
FIG. 2 is a sectional view of a hollow section which is bearing in a planar manner against a sheet-metal supporting part and is secured therein.

The hollow section 1 of FIG. 2 bears in a planar manner against a sheet-metal supporting part 2. The hollow section 1 is produced in one piece by blow molding. In order to secure the hollow section 1 on the sheet-metal supporting part 2, use is made of fastening elements 3 which are firmly integrated in the hollow section 1 and are in the form of protruding elements that can be latched into corresponding sockets on the sheet-metal supporting part 2.

Figure 15:
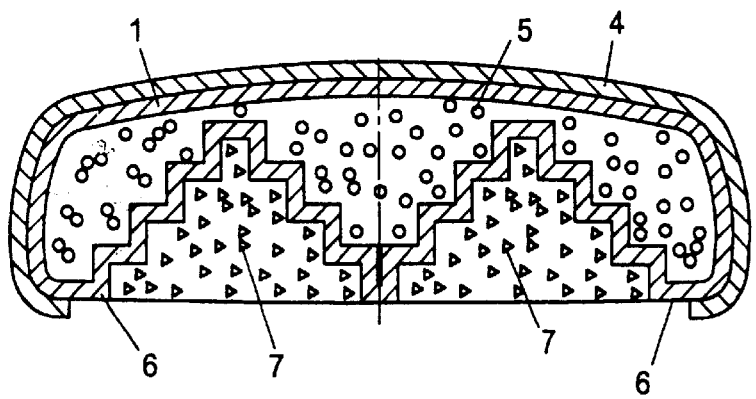
FIG. 15 is a sectional view similar to FIG. 14, but with an additional surface decoration on the outside of the hollow section.

According to FIG. 15, the outside of the hollow section 1 is provided with a surface decoration 4. This surface decoration 4 is placed into a mold and is attached to the hollow section 1 by the blow molding procedure. This connection is produced purely mechanically by pore connection.

The shape of the hollow section 1 can be selected freely with the prerequisite that the rear side bears completely or partially in a planar manner against the sheet-metal supporting part 2 in order to produce a connection. The rear side of the hollow section 1 can be profiled in a variety of ways, as is illustrated in the figures. In the structures according to FIGS. 5, 7 and 12 to 15, walls of the rear side have profilings which are in the form of steps and differ in thickness. Accordingly, a region which bears against the sheet-metal supporting part 2 has a greater thickness than a region which runs toward the outside.

Figure 3:
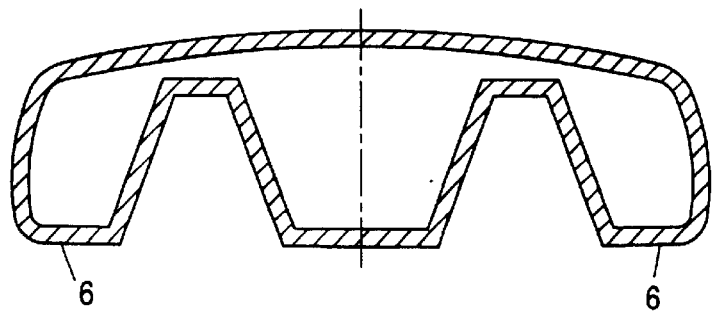
FIG. 3 is a sectional view of a hollow section with a trapezoidal profiling on a rear side.
Figure 4:
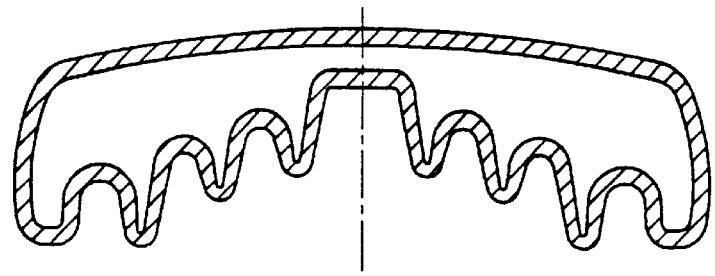
FIG. 4 is a sectional view of a hollow section with a rounded profiling in the form of steps.
Figure 5:
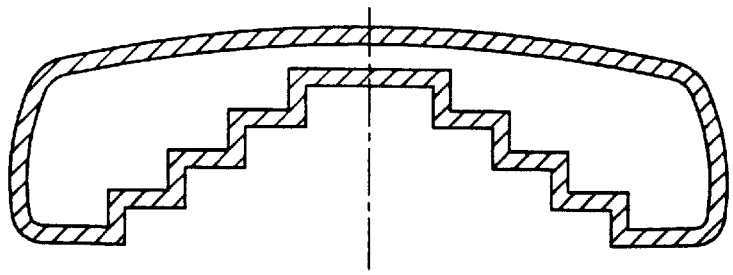
FIG. 5 is a sectional view of a hollow section with a profiling on the rear side which is in the form of steps.
Figure 6:
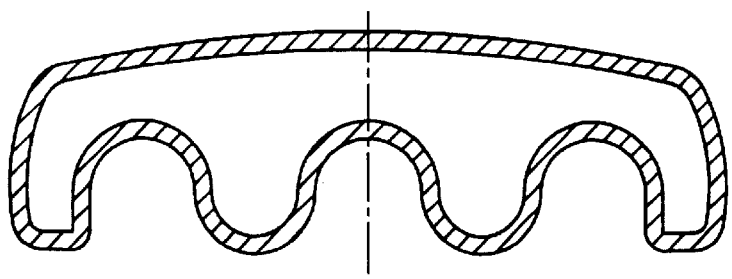
FIG. 6 is a sectional view of a hollow section with rounded profilings on the rear side.
Figure 7:
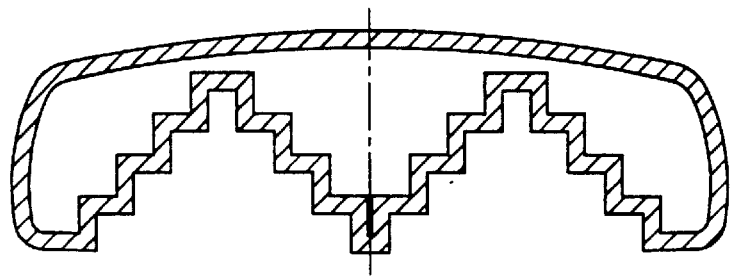
FIG. 7 is a sectional view of a variant of FIG. 5.
Figure 8:
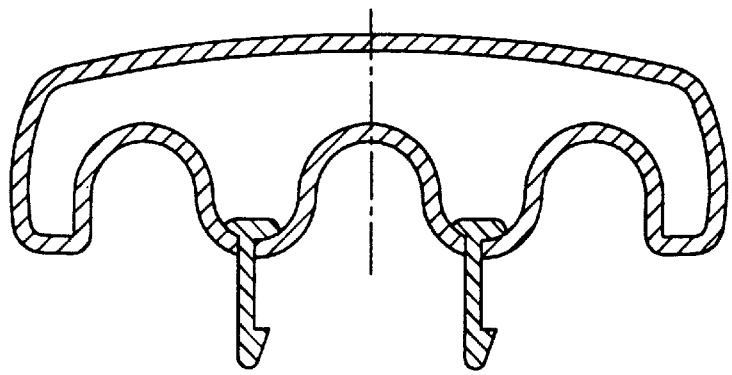
FIG. 8 is a sectional view similar to FIG. 6, but with integrated fastening elements.

The profiling according to FIG. 3 is trapezoidal and the profilings according to FIGS. 4, 6 and 8 are curved, with FIG. 4 having steps and FIG. 8 having fastening elements similar to FIG. 2.

Figure 12:
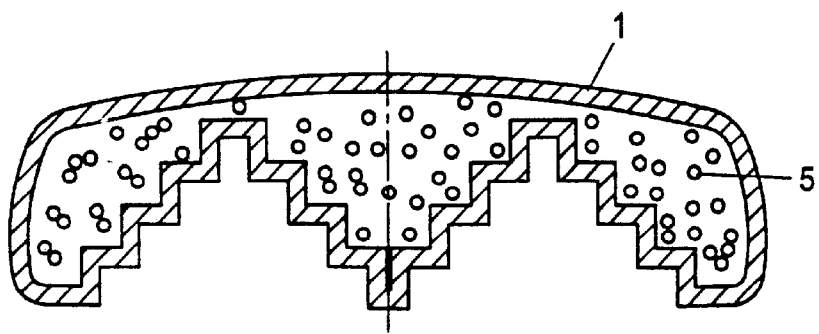
FIG. 12 is a sectional view similar to FIG. 7, but with a cavity filled with foam.
Figure 13:
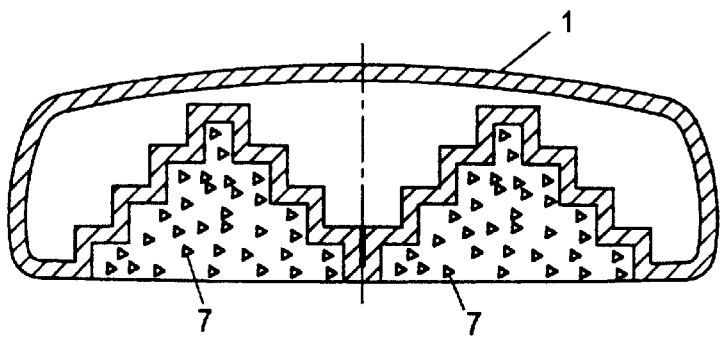
FIG. 13 is a sectional view similar to FIG. 7, but with a profiled foam part introduced into that region of the hollow section which is open to the outside.
Figure 14:
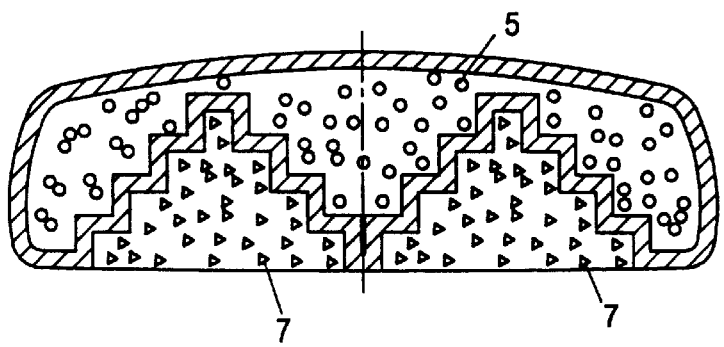
FIG. 14 is a sectional view similar to FIG. 12, but with an additional configuration of a profiled foam part in that region of the hollow section which is open to the outside.

According to FIG. 12, a cavity in the hollow section 1 is filled by foam 5. In contrast, according to FIG. 13, a profiled foam part 7 is introduced into a cavity which is present between bearing regions 6 of the rear side. According to FIG. 14, the foam 5 which is introduced by the filling procedure and the profiled foam part 7 differ in density and therefore have different properties.

Figure 9:
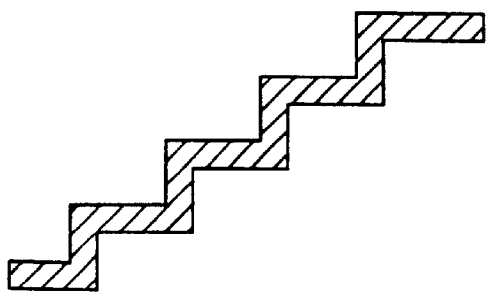
FIG. 9 is an enlarged, fragmentary, sectional view of a profiling in the form of steps.
Figure 10:
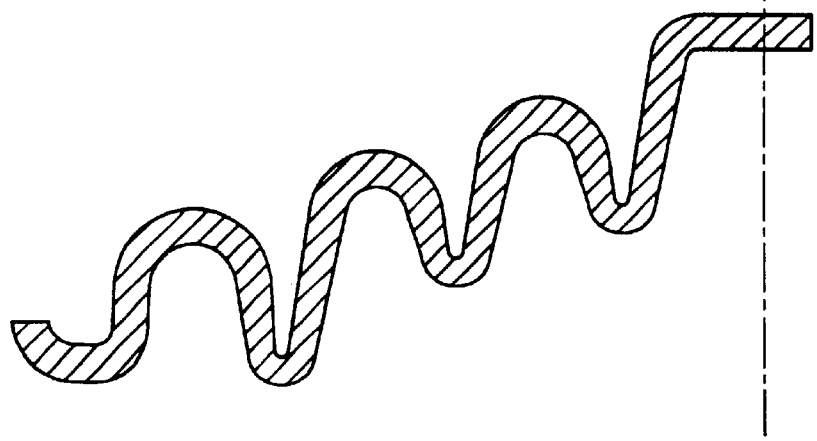
FIG. 10 is an enlarged, fragmentary, sectional view of a rounded profiling in the form of steps.
Figure 11:
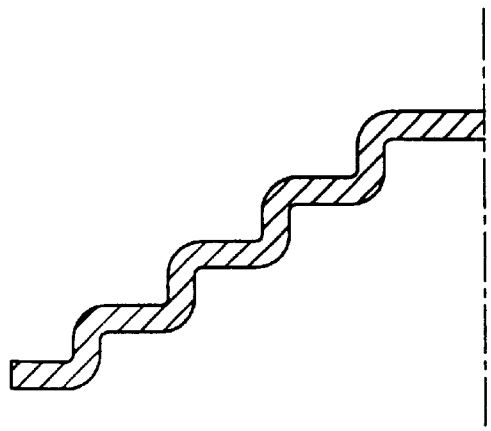
FIG. 11 is a fragmentary, sectional view similar to FIG. 9, but with external rounding of the steps.

FIG. 9 shows profilings in the form of steps, whereas in the case of the profiling illustrated in FIG. 10, tips of folds have a special thinned portion, so that predetermined breaking points are thereby provided. The reduction in wall cross section can be seen in particular in FIG. 11.

The structure according to the invention, in particular when the cavity is filled by foam, ensures that energy is adequately absorbed. In the event of an impact, the hollow section 1 is basically not subject to any deformation.

I claim:

1. In a motor vehicle having a sheet-metal supporting part with sockets, a covering part, the covering part comprising:

a one-piece hollow section produced by blow molding to be releasably secured on the supporting part, said hollow section having a rear side with fastening elements to be placed into a mold and integrated into said hollow section by blow molding, the sockets corresponding to said fastening elements.

2. The covering part according to claim 1, wherein said hollow section has an outside with a surface decoration.

3. The covering part according to claim 2, wherein said surface decorations are formed by textiles or films.

4. The covering part according to claim 2, wherein said surface decorations are placed into a mold and attached to said hollow section by a blow molding procedure.

5. The covering part according to claim 1, wherein said hollow section has a rear side constructed to bear against the sheet-metal supporting part.

6. The covering part according to claim 5, wherein only a part of said hollow section bears directly against the sheet-metal supporting part.

7. The covering part according to claim 1, wherein said rear side ha s a section in the form of steps.

8. The covering part according to claim 7, wherein said rear side ha s a wall having varying thickness.

9. The covering part according to claim 8, wherein a thickness of said wall of said rear side is larger in a region bearing against the sheet-metal supporting part than it is in other regions of said rear side.

10. The covering part according to claim 1, wherein said hollow section has a cavity filled with foam.

11. The covering part according to claim 10, wherein said hollow section is a closed body.

12. The covering part according to claim 1, wherein said hollow section has a rear side with bearing regions defining a cavity between said bearing regions, and foam introduced into said cavity.

13. The covering part according to claim 12, wherein said foam is introduced as a part having a predetermined section.

14. The covering part according to claim 10, including a foam part having a predetermined section and differing in density from said foam filling said cavity.

15. The covering part according to claim 1, wherein said hollow section has a wall with predetermined breaking points.

16. The covering part according to claim 7, wherein said steps on said rear side of the hollow section extend in a longitudinal direction of the hollow section.

17. The covering part according to claim 1, wherein said hollow section has a rear side with bearing regions defining a cavity between said bearing regions, and foam introduced into said cavity as a part having a predetermined section according to said cavity, said hollow section being connected to the sheet-metal supporting part by said foam part.

18. The covering part according to claim 14, wherein said foam and said foam part are formed from different basic materials.

* * * * *